United States Patent
Bourgeois et al.

(10) Patent No.: US 7,124,844 B2
(45) Date of Patent: Oct. 24, 2006

(54) STRADDLE-TYPE MESH SEAT

(75) Inventors: Luc Bourgeois, St-Hubert (CA); Eric Fournier, Orford (CA); Germain Cadotte, St-Elie d'Orford (CA); Martin Pernicka, Montreal (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/460,683

(22) Filed: Jun. 13, 2003

(65) Prior Publication Data
US 2004/0021348 A1 Feb. 5, 2004

Related U.S. Application Data

(60) Provisional application No. 60/388,304, filed on Jun. 14, 2002.

(51) Int. Cl.
*B62M 27/02* (2006.01)
*B62J 1/10* (2006.01)

(52) U.S. Cl. ............................ 180/182; 297/204

(58) Field of Classification Search ............... 297/206, 297/204, 217.1, 207, 205, 195.11, 195.1, 297/452.56, 201, 203, 215.12, 284.1, 215.1, 297/215.15, 4; 180/182, 219
See application file for complete search history.

(56) References Cited

U.S. PATENT DOCUMENTS

| 405,117 A | * | 6/1889 | Purdy et al. ............... 108/128 |
| 427,488 A | * | 5/1890 | Warwick .................... 297/205 |
| 1,512,145 A | * | 10/1924 | Starck ......................... 297/207 |
| 2,109,316 A | * | 2/1938 | Harley ........................ 180/219 |
| 6,059,368 A | | 5/2000 | Stumpf et al. |
| 6,125,521 A | | 10/2000 | Stumpf et al. |
| 6,315,364 B1 | * | 11/2001 | Fujita et al. ........... 297/452.56 |
| 6,371,233 B1 | * | 4/2002 | Ishii ........................... 180/182 |
| 6,666,507 B1 | * | 12/2003 | Ringgard ................. 297/195.1 |

OTHER PUBLICATIONS www.dahti.com/flash/home.html, 2 pgs., Jun. 12, 2002.

* cited by examiner

*Primary Examiner*—Milton Nelson, Jr.
(74) *Attorney, Agent, or Firm*—Osler, Hoskin & Harcourt LLP

(57) ABSTRACT

A recreational vehicle such as a snowmobile, personal watercraft, all-terrain vehicle, motorcycle, or boat has a straddle-type seat that includes a flexible sheet of material pulled tightly over a gap formed in a seat frame. In certain embodiments, a tightening mechanism ensures that the flexible sheet of material is pulled tightly over the gap. The flexible sheet of material forms a hammock-like straddle-type seat. The flexible sheet of material is a mesh material that allows water, snow, dust, and other debris to fall through the mesh to avoid debris buildup on the seat. Because water falls through the mesh material and both the top and bottom sides of the mesh material are exposed to the ambient air, the seat dries quickly.

23 Claims, 6 Drawing Sheets

STRADDLE-TYPE MESH SEAT

CROSS-REFERENCE TO RELATED APPLICATION(S)

This patent application relies for priority on U.S. Provisional Patent Application Ser. No. 60/388,304, filed on Jun. 14, 2002, entitled "MESH SEAT FOR A VEHICLE." The contents of that application are incorporated herein by reference.

BACKGROUND OF THE INVENTION

1. Field of the Invention

The present invention relates to straddle-type seats for vehicles.

2. Description of the Related Art

Recreational vehicles such as snowmobiles, motorcycles, personal watercraft (PWCs), boats, and all terrain vehicles (ATVs) often have straddle-type seats. The performance of such vehicles often depends, in part, on minimizing their weight. To decrease the weight of these recreational vehicles, designers have developed straddle-type seats that comprise a base frame, a lightweight foam such as polyurethane supported by the base frame, and a fabric cover made of a water-proof material such as nylon, vinyl, or leather that covers the foam to discourage the foam from soaking up water.

Snowmobiles, motorcycles, PWCs, boats, and ATVs are operated in areas that present various environmental conditions involving water, snow, dirt, dust and other fine particulate debris. Normal operation of such straddle-seat vehicles kicks up such material, causing the material to deposit on the straddle-seat. Because conventional straddle-type seats are solid, such material disadvantageously builds up on the seat.

Because the riders of these vehicles prefer a dry seat (or at least a seat that can be as dry as possible), interest developed in designing a seat that dries quickly. Such a seat, however, is not known in the prior art.

SUMMARY OF THE INVENTION

One aspect of embodiments of the present invention provides a light-weight straddle-type seat for a vehicle.

An additional aspect of embodiments of the present invention provides a mesh seat that allows debris such as water, snow, dirt, and dust to fall through the seat to leave the surface of the seat dry and/or unobstructed by such debris.

A further aspect of embodiments of the present invention provides a quick-drying mesh seat for use on straddle-type vehicles that often get wet.

A further aspect of embodiments of the present invention provides a vehicle with a frame, a steering system supported by the frame for steering the vehicle, an engine supported by the frame, and a propulsion system operatively connected to the engine and supported by the frame. The vehicle also includes a straddle-type seat disposed on the frame. The straddle-type seat has a seat frame defining a gap therein, and a material suspended over the gap and attached to the seat frame to define a seating area.

One aspect of embodiments of the present invention provides a seat with a stretched material thereon, where the seat may be used on one of a variety of vehicles such as a snowmobile, a motorcycle, an ATV, a PWC, or a boat. The material may be pulled taut over the gap such that the material is suitable for supporting a rider thereon.

Another aspect of embodiments of the present invention provides a seat with a stretched material thereon, where the seat includes a tightening mechanism to hold the material tautly across the gap. The tightening mechanism also may be used to adjust the tautness of the material stretched thereacross.

A further aspect of embodiments of the present invention provides a straddle-type seat that includes a seat frame defining a gap therein, and a material suspended over the gap and attached to the seat frame to define a straddle-type seating area. The seat frame is constructed and arranged to mount onto one of the above-described straddle-type seat vehicles.

Still another aspect of embodiments of the present invention provides a seat with a material stretched thereon, where the material has an inverted U shape when viewed from the rear.

One other aspect of embodiments of the present invention provides a straddle-type seat with a material stretched thereon, where the frame of the seat has a unitary construction. In certain embodiments, the frame may be made of a plastic material or a carbon fiber composite.

A further aspect of embodiments of the present invention provides a straddle-type seat with a material stretched thereon, where the material is embedded into the frame of the seat so that the material is permanently affixed to the frame.

Another aspect of embodiments of the present invention provides a straddle-type seat with a material stretched thereon where the material is an elastic cord that is threaded (or strung) onto the frame in a manner similar to the way in which a tennis racket is strung. With respect to this particular concept, depending upon the force applied to the cord when the seat frame is strung, seat rigidity may be adjusted. Moreover, the owner may re-string the seat to accommodate personal preferences.

Additional and/or alternative objects, features, aspects, and advantages of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where:

FIG. 7b is a front elevational view of the top portion of the seat illustrated in FIG. 7a;

DETAILED DESCRIPTION OF EMBODIMENTS OF THE INVENTION

Figure 1:
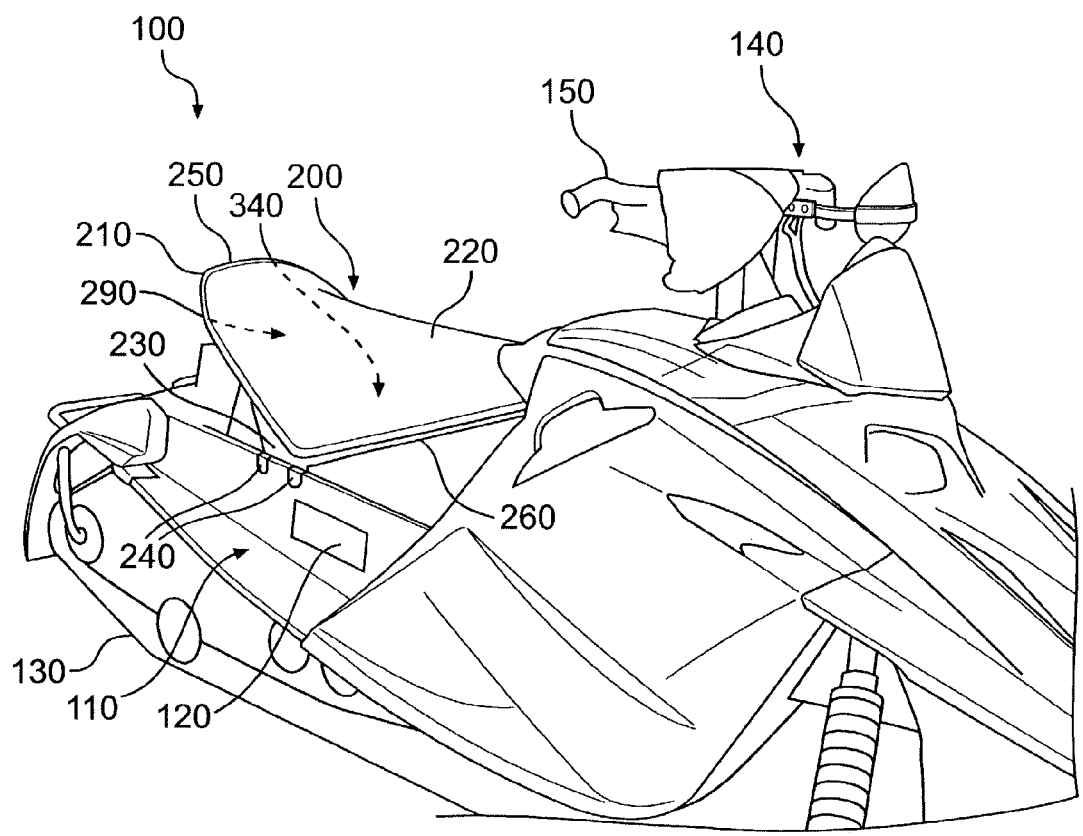
FIG. 1 is a partial, front, right, perspective view of a snowmobile according to an embodiment of the present invention.
Figure 2:
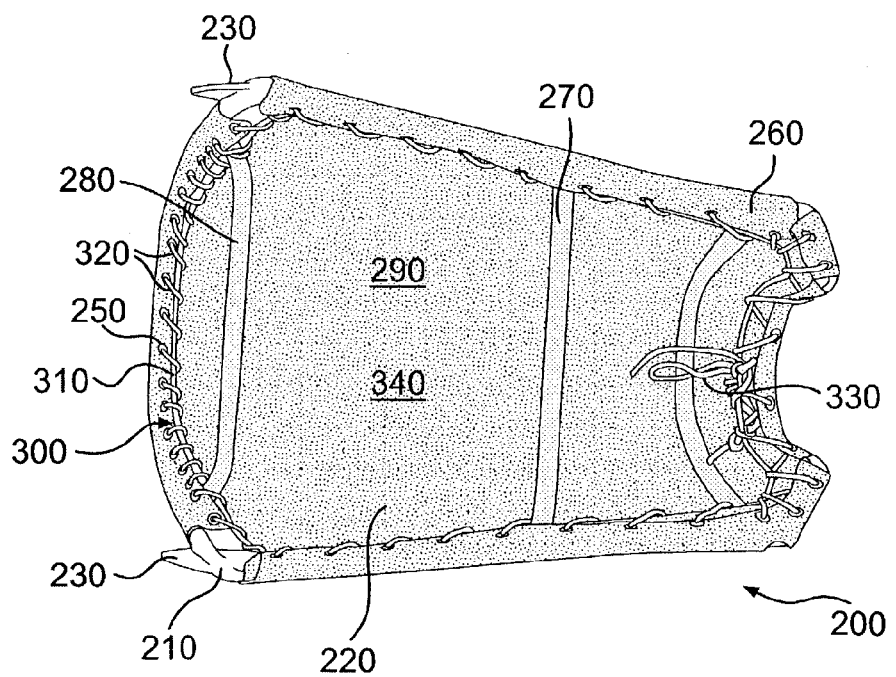
FIG. 2 is a bottom view of a seat of the snowmobile illustrated in FIG. 1.

FIGS. 1 and 2 illustrate a snowmobile 100 incorporating one embodiment of the seat that is the focus of the present invention. While a snowmobile is illustrated as one environment for the seat, the present invention may alternatively be embodied in a variety of other vehicles, such as recreational vehicles including motorcycles, all-terrain vehicles (ATVs), personal watercraft (PWCs), boats, etc. In other words, it is contemplated that the seat of the present invention may be used on a wide variety of vehicles and, as a result, is not limited solely to those referred to herein.

As shown in FIG. 1, the snowmobile 100 includes a frame 110, which includes a tunnel 120. The frame 110 supports an engine (not shown) that operatively connects to a propulsion system 130. In the illustrated embodiment, the propulsion system 130 comprises an endless track. However, if the present invention were alternatively embodied in a boat or a PWC, the propulsion system 130 might comprise a jet propulsion system or a propeller. Similarly, if the present invention were embodied in a motorcycle or an ATV, the propulsion system 130 may comprise one or more wheels. In addition, for an ATV, the propulsion system 130 may comprise one or more tracks like the type known on snow coaches and tanks.

The frame 110 also supports a steering system 140. The steering system 140 comprises pivoting handlebars 150 that are operatively connected to skis (not shown). If the present invention were embodied in a motorcycle or an ATV, one or more wheels would replace the skis. Similarly, if the present invention were embodied in a boat or a PWC, the handlebars 150 (or steering wheel) would be operatively connected to the propulsion system to control the direction of thrust of the propulsion system or to a rudder.

As shown in FIG. 1, a straddle-type seat 200 is mounted to the frame 110. The straddle-type seat 200 includes a rigid seat frame 210 and a mesh seat material 220 that covers the rigid seat frame 210. The seat 200 preferably also includes a tightening mechanism 300, which is shown in FIG. 2.

Referring to FIGS. 1 and 2, the rigid seat frame 210 has a base portion 230 that rigidly mounts directly to the tunnel 120 via bolts 240. Alternatively, the seat 200 could mount to any other convenient part of the frame 110 using any other type of fastening system. A rear, inverted U-shaped, tubular member 250 extends upwardly and rearwardly from the base portion 230. Similarly, a front, inverted U-shaped, tubular member 260 extends upwardly and forwardly from the base portion 230. The front member 260 preferably mounts to the frame 110 at a different location from the mounting location of the base portion 230 so that the connection between the vehicle frame 110 and the seat 200 is rigid and/or strong. For example, the embodiment illustrated, the front member 260 is attached to the frame 110 at a forward portion thereof. Front and rear cross-braces 270, 280 preferably extend between the left and right sides of the U-shaped members 260, 250, respectively, to provide additional structural support to the seat frame 210. The members 250, 260, the base 230, and the cross-braces 270, 280 may be welded, glued, bolted, or otherwise rigidly fastened to each other.

In the context of describing the present invention, the term "U-shaped" encompasses a variety of shapes such as three sides of a rectangle. The middle portion of the U shape may be flat (as in a rectangular U shape), may have a smooth curve (as in the letter "U"), or may have a variety of other irregular shapes. For example, as illustrated in FIG. 2, the U-shaped, front member 260 includes a middle portion that bends in a variety of directions to match a contour of the vehicle frame 110 and vehicle components. The opposite ends of a U shape may be parallel to each other or be skewed from each other as in the members 250, 260, which each include ends that spread laterally outwardly from each other as they approach the base portion 230.

The members 250, 260 preferably comprise strong, light, tubular members made of a material such as aluminum, titanium, or an alloy of magnesium, to name but a few examples. Alternatively, a variety of other strong, light materials may be used without departing from the scope of the present invention. For example, the members 250, 260 may be made from a composite material including carbon fiber. A gap 290 is defined between the perimeters of the members 250, 260.

While the illustrated rigid seat frame 210 includes various specific rigid components (i.e., the members 250, 260, the base 230, and the cross-braces 270, 280), it is contemplated that a variety of alternative structures may replace the structural components of the rigid seat frame 210 without departing from the scope of the present invention. For example, the rigid seat frame may alternatively comprise a unitary, bent, metal sheet with a hole formed therein. Alternatively, the rigid seat frame may comprise a plurality of tubular members that form an "O" or oval shape. As is discussed in greater detail below, the function of the rigid seat frame 210 is to support the mesh seat material 220 that is suspended across a gap 290 in the rigid seat frame 210. As would be appreciated by one skilled in the art, and as discussed in greater detail below, a variety of alternative rigid seat frame structures may serve this function without departing from the scope of the present invention.

The mesh seat material 220 extends between the members 250, 260 and extends over the gap 290. As illustrated in FIG. 2, the mesh seat material 220 preferably wraps around the perimeter of the U-shaped seat members 250, 260.

The tightening mechanism 300 holds the mesh seat material 220 tightly over the gap 290 such that the mesh seat material 220 can support the weight of a rider sitting thereon. In the illustrated embodiment, the tightening mechanism 300 comprises an inner frame 310 that extends around the perimeter of the members 250, 260 slightly inwardly from the members 250, 260 such that the inner frame 310 extends slightly into the gap 290. The tightening mechanism 300 also includes a plurality of grommets 320 (or other reinforced holes) spaced around the perimeter of the mesh seat material 220. To secure the mesh seat material 220 onto the rigid seat frame 210, the mesh seat material 220 is first extended over the gap 290 and wrapped around the perimeter. of the members 250, 260. A rope 330 is then threaded back and forth between the grommets 320 and the inner frame 310 to pull the mesh seat material 220 toward the inner frame 310 and thereby make the mesh seat material 220 taut over the gap 290.

Because the members 250, 260 comprise upside-down U shapes that extend at an obtuse angle relative to each other, the gap 290 formed between them also takes on a generally upside-down U shape as viewed from the front or rear of the seat 200. The upside-down U shape provides a comfortable straddle-type seat 200 for the rider.

In the illustrated embodiment, the tightening mechanism 300 tightens the entire perimeter of the mesh seat material 220 around the entire perimeter of the rigid seat frame 210. However, this is not required to practice the present invention. To the contrary, if desired, only forward and rearward ends of the perimeter of the mesh seat material 220 may be secured to the rigid seat frame 210. Regardless of the extent to which the mesh seat material 220 is secured to the frame 210, to ensure that the mesh seat material 220 is sufficiently secured to the rigid seat frame 210, the mesh seat material 220 is preferably secured over at least half of the perimeter of the members 250, 260. As would be appreciated by those skilled in the art, the mesh seat material 220 may cover less than half of the perimeter of the member 250, 260 without departing from the scope of the present invention.

Because it is a mesh, the mesh seat material 220 includes holes through which water, snow, dust, and other small particles may fall. By allowing such particles to fall through the seat 200, the particles are discouraged from disadvantageously building up on the seat 200. Furthermore, an air space 340 is provided below the mesh seat material 220. The air space 340 preferably opens up to the ambient environment so that particles that fall through the mesh seat material 220 are expelled from the snowmobile 100. The mesh seat material 220 and air space 340 are particularly advantageous in recreational vehicles that encounter wet environments because the mesh seat material 220 and air space 340 combine to discourage the seat material from becoming wet during use. They also help to dry out the mesh seat material 220 quickly.

While the mesh seat material 220 is preferred for the seat 200 of the present invention, the mesh seat material 220 is not the only material considered to fall within the scope of the present invention. To the contrary, it is contemplated that a variety of other flexible materials may be employed without deviating from the scope of the present invention. For example, a solid flexible sheet material such as leather or vinyl may be used. Alternatively, a thicker, padded sheet of flexible material such as thin foam enclosed in fabric may alternatively be used. Furthermore, additional padding may be provided on top of or below the seat material. Generally, any type of flexible sheet material that can be pulled tightly over the gap 290 is contemplated for use with the present invention.

The tightly-pulled mesh seat material 220 provides a comfortable seat 200 for the rider of the snowmobile 100. Although the mesh seat material 220 is tightly pulled over the rigid seat frame 210, the mesh seat material 220 can still deform, flex, or move slightly such that it comfortably supports the rider. The air space 340 provided below the mesh seat material 220 is preferably deep enough that the mesh seat material 220 does not contact a rigid portion of the snowmobile 100 when it is deformed downwardly under the weight of the rider. Consequently, the mesh seat material 220 preferably cannot deform so much that the rider is uncomfortably supported against a hard surface of the snowmobile 100.

While the illustrated tightening mechanism 300 employs a rope 330 that pulls the mesh seat material 220 taut, a variety of other tightening mechanisms may be alternatively used to tighten the mesh seat material. One alternate example is provided in FIGS. 3 and 4, as discussed in greater detail below.

Figure 3:
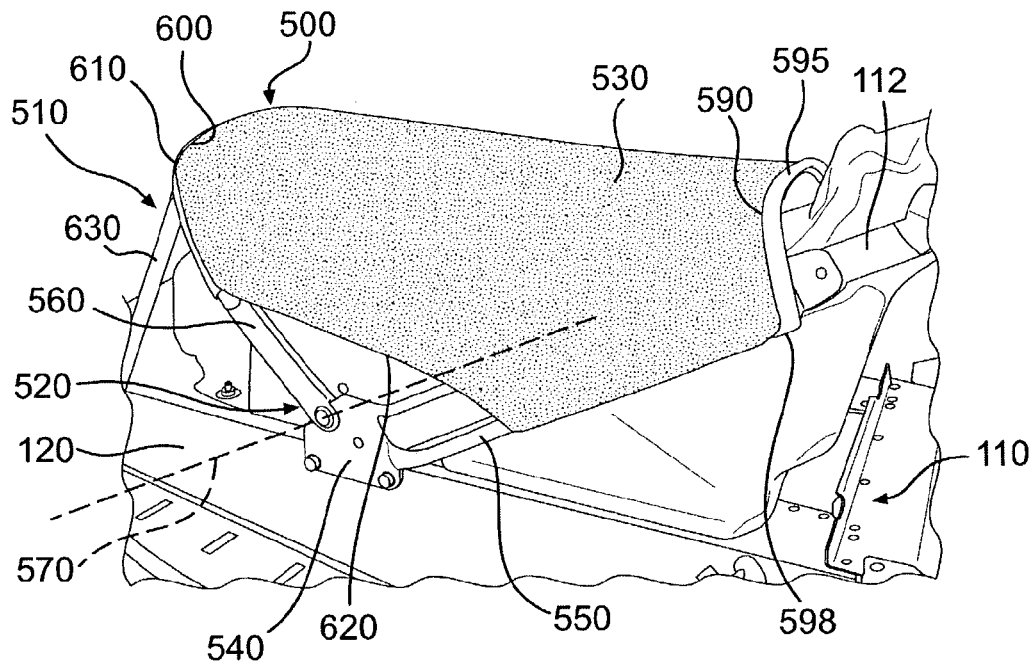
FIG. 3 is a partial, front, right, perspective view of a snowmobile according to an alternative embodiment of the present invention.
Figure 4:
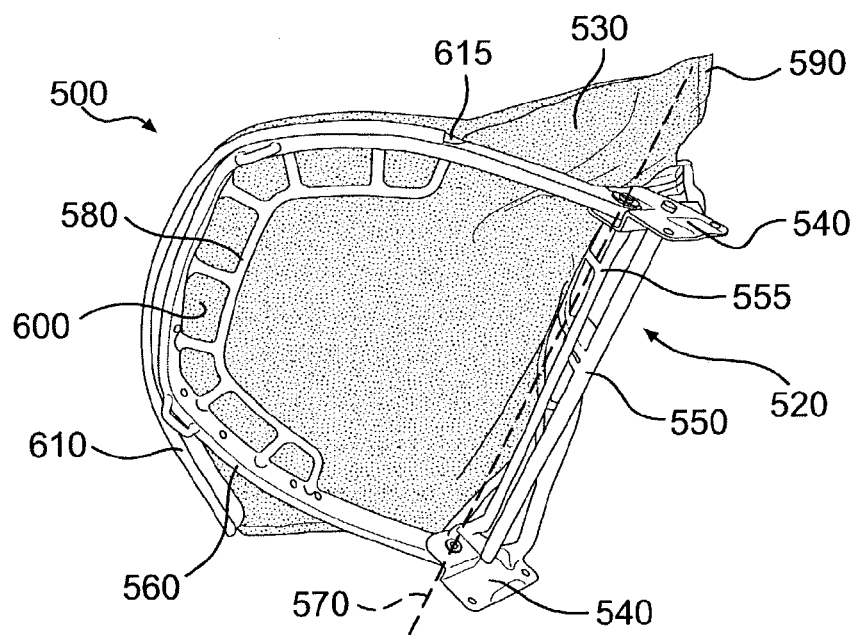
FIG. 4 is a lower, right, rear, perspective view of a seat of the snowmobile illustrated in FIG. 3.

FIGS. 3 and 4 illustrate an alternative seat 500 with an alternative tightening mechanism 510. Like the seat 200, the seat 500 includes a rigid seat frame 520, a mesh seat material 530, and a tightening mechanism 510.

The rigid seat frame 520 includes a base portion 540 and front and rear upside-down U-shaped tubular members 550, 560. The base portion 540 mounts to the frame 110 of the snowmobile 100 in the same manner as in the previous embodiment.

As in the previous embodiment, the front, inverted U-shaped, tubular member 550 extends upwardly and forwardly from the base portion 540. As illustrated in FIG. 3, the construction differs in that an upper, forward portion of the front member 550 preferably is welded or otherwise rigidly attached to a tubular portion 112 of the frame 110. The tubular portion 112 is a portion of the frame 110 that extends from the tunnel 120 upwardly and forwardly to a position adjacent to the steering system 140. As would be appreciated by those skilled in the art, the front member 550 need not be attached to the tubular member 112. Instead, the front member 550 may be a stand-alone member connected to the frame 110 by the base portion 540. To reinforce the U shape of the front member 550, the rigid seat frame 520 also includes a web of supporting braces 555.

The rear, upside-down, U-shaped tubular member 560 is connected to the base portion 540 for pivotal movement relative to the base portion 540, the front portion 550, and the frame 110 about a laterally-extending pivot axis 570. As illustrated in FIG. 4, the rigid seat frame. 520 includes a web of supporting braces 580 that reinforce the U shape of the rear member 560.

The mesh seat material 530 includes a forward perimeter portion 590 connected to an elongated plastic front clamp 595 having a hook-shaped cross section. The hook shape of the clamp 595 hooks onto a lip 598 formed on the perimeter of the front member 550. In the embodiment illustrated in FIGS. 4 and 5, the mesh seat material 530 is sewn onto the plastic front clamp 595. However, as would be appreciated by those skilled in the art, other attachment means may be employed without departing from the scope of the invention. For example, the mesh seat material 530 may be glued or riveted to the front clamp 595. Similarly, a rearward perimeter portion 600 of the mesh seat material 530 is attached to an elongated plastic rear clamp 610 that hooks onto a lip 615, which is formed on the perimeter of the rear member 560. As with the forward perimeter portion 590, the rearward perimeter portion 600 preferably is sewn onto the rear clamp 610, but other attachment means are intended to fall within the scope of the present invention.

As illustrated in FIG. 3, the mesh seat material 530 attaches to the rigid seat frame 520 over a majority of the perimeter of the rigid seat frame 520, but includes open side sections. A side perimeter portion 620 of the mesh seat material 530 that does not connect to the clamps 595, 610 or the rigid seat frame 520 is preferably reinforced to strengthen the perimeter 620.

To maintain the mesh seat material 530 in a taut condition, the present invention includes a tightening mechanism 510. As shown in FIG. 3, the tightening mechanism 510 comprises a tension strap 630 that extends between the rear member 560 and the frame 110. Applying tension to the strap 630 pivotally urges the rear member 560 rearwardly (counter-clockwise as viewed in FIG. 3) away from the front member 110 and, thereby, pulls, the mesh seat material 530 taut against the frame 520.

The seat 500 need not be constructed in the manner illustrated, and may be modified in a variety of ways without departing from the scope of the present invention. For example, the front member 550 could be pivotally connected to the frame 110 and the rear member 560 could be rigidly connected to the frame 110. In such an embodiment, the tightening mechanism 510, if a strap 630, necessarily would extend between the front member 550 and the frame 110.

Figure 5:
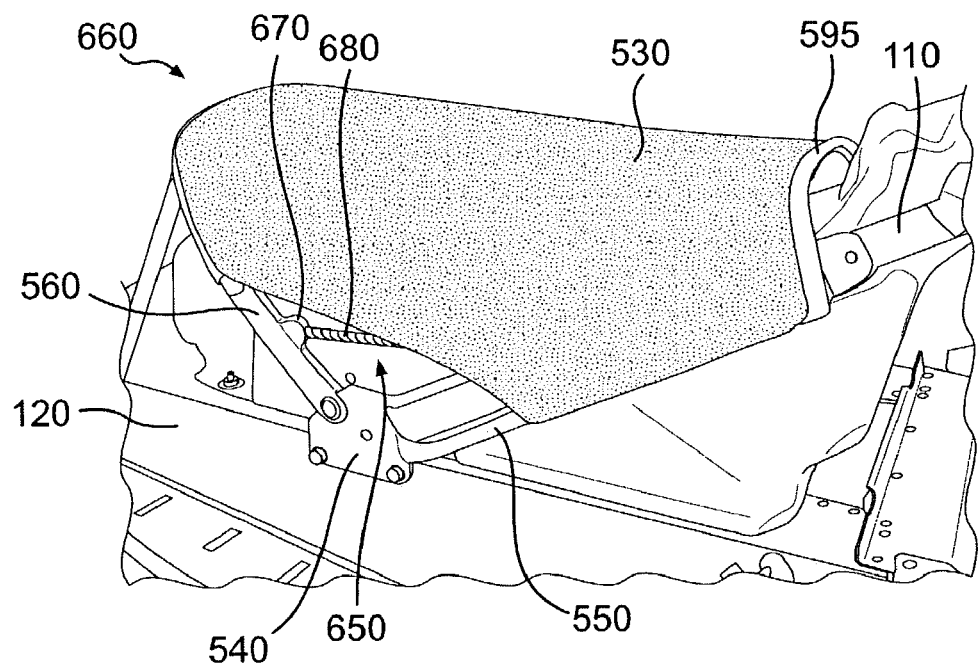
FIG. 5 is a partial, front, right, perspective view of a snowmobile according to another alternative embodiment of the present invention.
Figure 6:
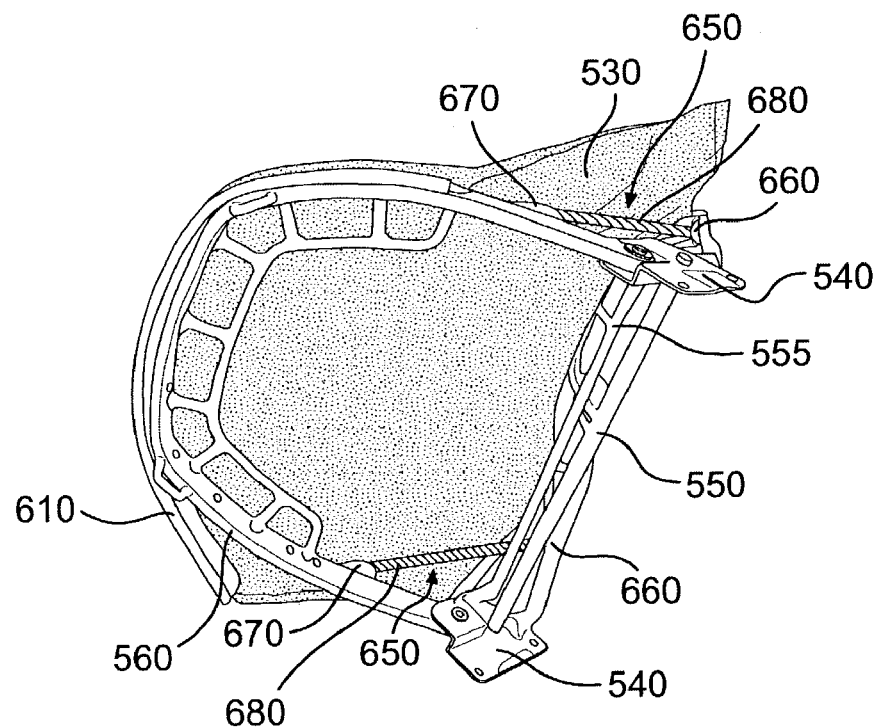
FIG. 6 is a lower, right, rear, perspective view of a seat of the snowmobile illustrated in FIG. 5.

While the illustrated tightening mechanism 510 is a tension strap 630, a variety of other tightening mechanisms may be used in the alternative. FIGS. 5 and 6 illustrate one alternative to the strap 630. In these figures, the tightening mechanism 650 comprises several interrelated components.

As illustrated in FIGS. 5 and 6, the tightening mechanism 650. comprises a linear actuator that extends between the front and rear members 550, 560 and applies a spreading force that separates the members 550, 560 from each other and pulls the mesh seat material 530 taut. The linear actuator 650 includes a front anchor 660 mounted to the front member 550, and a rear anchor 670 mounted to the rear member 560. A threaded rod 680 extends between the anchors 660, 670. In the embodiment shown, the threaded rod 680 is coupled to the anchor 660 to allow rotational movement but prevent the rod 680 from moving axially relative to the anchor 660. The threaded rod 680 threads into a threaded portion of the anchor 670 such that rotation of the threaded rod 680 axially moves the threaded rod 680 relative to the anchor 670. The anchors 660, 670 are preferably pivotally connected to the front and rear members 550, 560, respectively, to allow slight pivotal movement of the anchors 660, 670 relative to their respective members 550, 560 about laterally extending axes.

When the threaded rod 680 is rotated so that it moves forwardly relative to the anchor 670, the front and rear members 550, 560 are spread apart. This draws the mesh seat material 530 taut. Once the mesh seat material 530 is pulled taut, the threaded rod 680 may be held in position by a locking mechanism (e.g., a lock nut, etc.) or by friction. As would be appreciated by those skilled in the art, the orientation of the anchors 660, 670 and threaded rod 680 may be reversed so that the anchor 660 permits relative longitudinal movement of the threaded rod 680 with respect thereto. As also would be appreciated by those skilled in the art, the threaded rod 680 may be rotated to provide any of a number of taut states for the mesh seat material 530. As a result, the rider may adjust the comfort of the seat 500 to accommodate personal preference.

While each of the illustrated embodiments include tightening mechanisms 300, 510, 650, a tightening mechanism need not be provided at all. For example, the mesh seat material may be stretched around the perimeter of the seat frame during construction such that the pre-tightened mesh seat material does not require additional tightening. Examples of such seats are discussed in greater detail below.

Figure 7A:
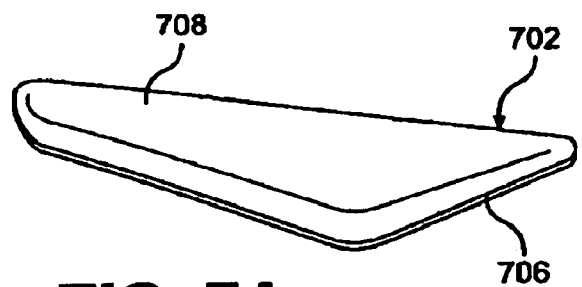
FIG. 7a is a right side view of a top portion of a seat according to one embodiment of the present invention.
Figure 7B:
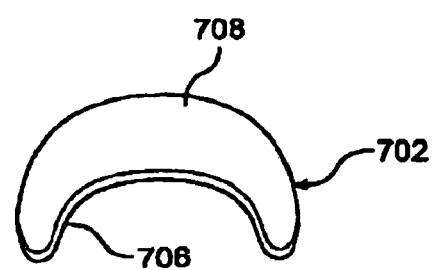
Figure 7C:
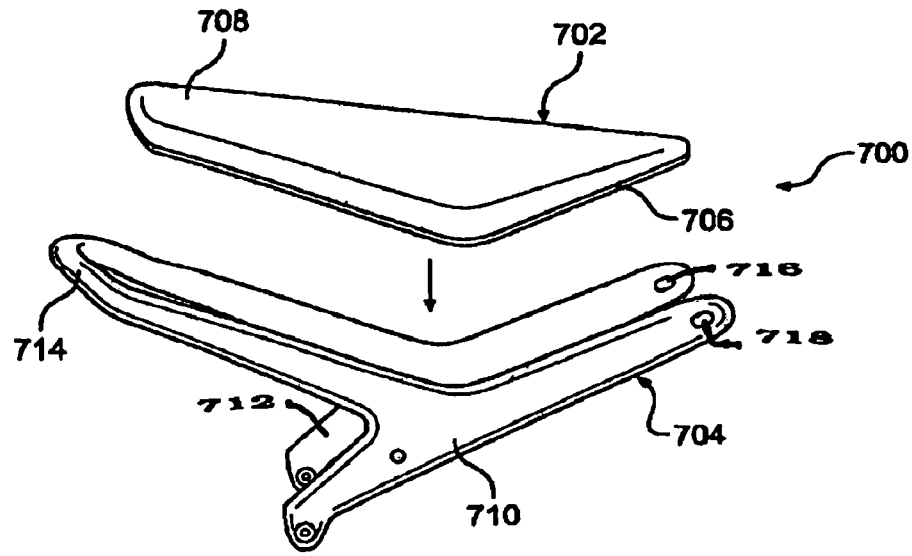
FIG. 7c is a right side view of the top portion of the seat illustrated in FIGS. 7a and 7b, shown in juxtaposition with an exemplary frame according to one embodiment of the present invention.

FIGS. 7a through 7c illustrate yet another embodiment of a seat 700 of the present invention. In this embodiment, the seat 700 comprises two parts, an upper portion 702 and a lower portion 704. The upper portion 702 includes a frame element 706 with a mesh fabric 708 stretched thereover.

As illustrated in FIG. 7a, the frame 706 is V-shaped when viewed from the side. The frame has an inverted U shape when viewed from the front, as illustrated in FIG. 7b. The frame 706 preferably is constructed from a plastic material to which the fabric 708 is attached. As would be appreciated by those skilled in the art, the fabric 708 may be attached to the frame in any of a number of different ways. For example, the fabric may be affixed to the frame 706 with a suitable adhesive, by rivets, or by some alternative fastener(s). Alternatively, the fabric may be integrally molded into the frame 706 itself, The exact attachment mechanism is not important to the present invention. All that is required is that the attachment be suitably strong so that the fabric 708 may support the weight of the rider of the recreational vehicle onto which the seat 700 is disposed.

The fabric 708 may be selected from any of a number of different varieties. As with the material selected for the frame 706, the material that comprises the fabric 708 is not important to the present invention. What is preferred is that the fabric permit particulate material to pass therethrough as discussed above. Alternatively, it is preferred that the fabric be a material that dries quickly should it become wet. As would be appreciated by those skilled in the art, it is preferred that the fabric be sufficiently strong to support the weight of a rider of the vehicle on which the seat 700 is disposed.

The frame 706 preferably is constructed so that it matingly engages the lower portion 704 of the seat. In addition, it is preferred that the upper portion 702 be attached to the lower portion 704. It is not necessary for the upper portion 702 to be permanently affixed to the lower portion 704, although this is one embodiment of the invention. Instead, so that the fabric 708 may be more easily replaced, in this particular embodiment, the upper portion 702 is easily detached from the lower portion 704. As a result, if the seat 700 should become worn or damaged, the upper portion 702 may be easily replaced with a new upper portion 702. Also, with this construction, it is possible to manufacture a variety of upper portions 702 of different colors, which the rider may select based upon personal preference.

In the illustrated embodiment, the lower portion 704 of the seat 700 comprises a unitary frame. The lower portion 704 includes a right diagonal portion 710 and a left diagonal portion 712. The right and left diagonal portions 710, 712 are connected to one another via a U-shaped portion 714. In this embodiment, the front of the lower portion 704 does not include a cross member that connects the right and left diagonal portions 710, 712 to one another. In this embodiment, the frame of the vehicle provides structural support and rigidity to the lower portion 704 of the frame 706 after it is positioned on the vehicle.

The right and left diagonal portions 710, 712 include upper mounting holes 716 and lower mounting holes 718 therethrough. The upper mounting holes 716 are provided so that the lower seat portion 704 may connect to the frame of the vehicle at a forward portion. The lower mounting holes are provided so that the lower seat portion 704 also may be attached to the vehicle frame. In particular, the mounting holes 716, 718 are positioned to facilitate attachment of the lower seat frame 704 to a snowmobile frame.

As indicated above, while the seat 700 illustrated is designed specifically for use on a snowmobile, the seat 700 may be adapted for use on any of a wide variety of other recreational vehicles including, for example, ATVs, motorcycles, PWCs, and boats. Moreover, as should be appreciated by those skilled in the art, the number and locations of the mounting holes 716, 718 may be varied so that the seat 700 may be attached to a particular vehicle without departing from the scope of the present invention.

In the embodiment illustrated, the lower portion 704 of the seat 700 preferably is made from a rigid, yet resilient, material such as plastic. It is also contemplated that the lower portion 704 of the seat 700 may be constructed from a carbon fiber composite. Other materials are also suitable, such as aluminum, titanium, an alloy of magnesium, or steel, to list but a few examples. Regardless of the material selected, it is preferred that the material have sufficient strength to support the weight of the rider. In addition, it is preferred that the seat 700 be constructed so that it is as light in weight as possible. This assures that the weight of the vehicle will not be increased unnecessarily by the inclusion of the seat 700.

Figure 8:
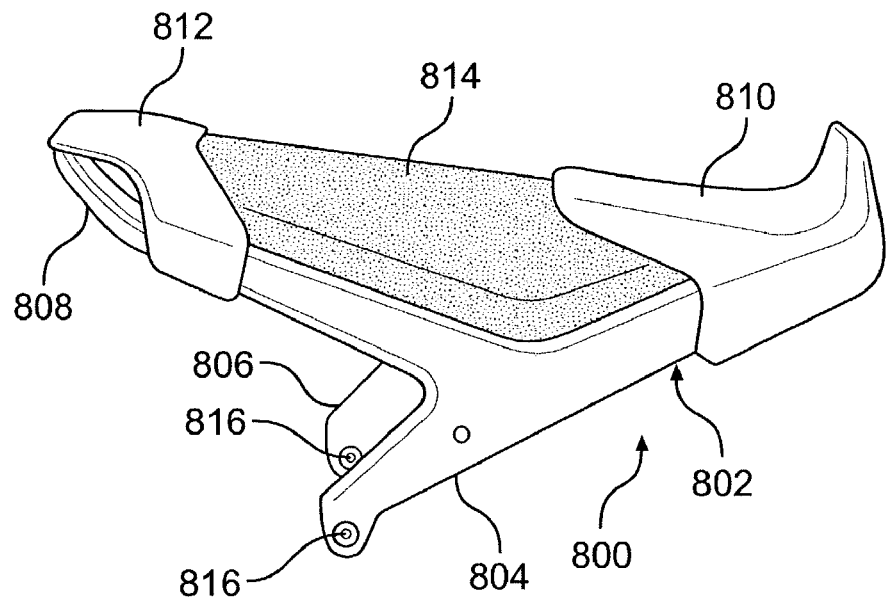
FIG. 8 is a right side view of another seat according to another embodiment of the present invention where the seat includes a mesh material thereon.

FIG. 8 illustrates another embodiment of a seat 800 according to the teachings of the present invention. In this embodiment, the seat 800 has a frame 802 with right and left side members 804, 806. As in the previous embodiment, the right and left side members 804, 806 are laterally disposed apart from one another and provide the basic structure for the seat 800. A rear connecting member 808 connects the right and left side members 804, 806 to one another.

In the embodiment illustrated in FIG. 8, the right and left side members 804, 806 are generally Y-shaped. Preferably, the right and left side members 804, 806 are made of a carbon fiber composite. However, as discussed previously, there are large variety of materials that may be selected for the construction of these members. The rear connecting member 808 is preferably made from a tubular metal material, such as aluminum, titanium, an alloy of magnesium, or steel, to name a few representative materials. Alternatively, the rear connecting member 808 may be made from plastic or from a material such as carbon fiber composite. The rear connecting member 808 may be connected to the right and left side members 804, 806 in any manner known to those skilled in the art. For example, the rear connecting member 808 may be bolted to the right and left side members or may be adhered to the right and left side members 804, 806 with an adhesive.

The seat 800 also includes a front cushion 810 and a rear cushion 812. The front and rear cushions 810, 812 increase comfort to the rider during operation of the vehicle. The cushions 810, 812 preferably are manufactured from a suitable padded material such as foam rubber. Of course, as should be appreciated by those skilled in the art, the cushions 810, 812 may be made from any other suitable cushion material.

The seat 800 also includes a mesh fabric 814 thereon that is connected to the right and left side members 804, 806. As may be understood from the figures, the front and rear cushions 810, 812 also may connect to the mesh fabric 814 so that the fabric 814 is maintained in a taut condition. The precise structures to which the mesh fabric 814 is attached is not critical to the present invention, as would be appreciated by those skilled in the art.

As discussed above, the mesh material 814 may connect to the various components of the seat 800 in a number of ways. For example, the mesh material 814 may be connected to the seat 800 via a suitable adhesive or fasteners. Alternatively, the mesh material 814 may be molded into the components of the seat 800 during its construction so that the mesh fabric 814 cannot be easily separated from the seat 800 during operation of the vehicle.

As may be appreciated from the illustration of the seat 800, when the right and left side members 804, 806 are connected to one another via the rear member 808, the seat frame will look similar to the lower portion 704 of the seat 700 illustrated in FIGS. 7a through 7c. In particular, as with the seat 700, the seat frame of the seat 800 is opened at the forward end. In other words, the forward ends of the right and left side members 804, 806 do not connect with one another. Instead, the forward portions of the right and left side members 804, 806 are designed to connect to the frame of the vehicle on which the seat 800 is positioned.

Figure 9:
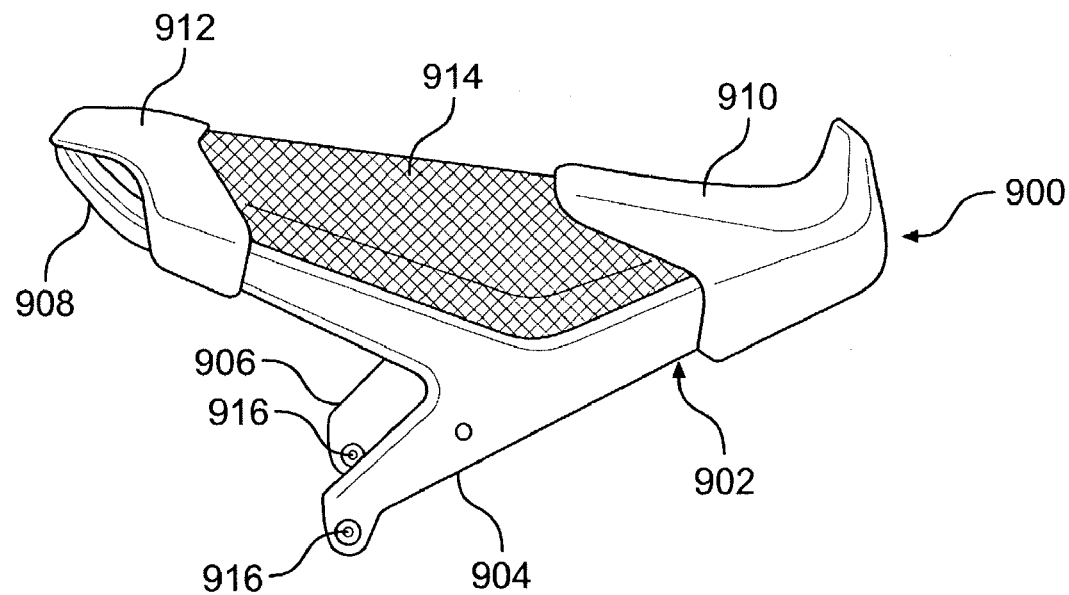
FIG. 9 is a right side view of another seat according to still another embodiment of the present invention where the seat is strung.

FIG. 9 illustrates still another embodiment of a seat 900 of the present invention. This embodiment of the seat 900 is similar to that depicted and described in connection with the seat 800. The seat 900 has a frame 902 with right and left side members 904, 906. The right and left side members 904, 906 connect to one another via a rear member 908. Front and rear cushions 910, 912 are also provided on the seat 900, as with the previous example. The seat 900 also includes one or more mounting holes 916 so that the seat 900 may be connected to a recreational vehicle.

FIG. 9 illustrates still another embodiment of a seat 900 of the present invention. This embodiment of the seat 900 is similar to that depicted and described in connection with the seat 800. The seat 900 has a frame 902 with right and left side members 904, 906. The right and left side members 904, 906 connect to one another via a rear member 908. Front and read cushions 910, 912 are also provided on the seat 900, as with the previous example. The seat 900 also includes one or more mounting holes 916 so that the seat 900 may be connected to a recreational vehicle.

The seat 900 differs from the seat 800 in that the material of the seat 900 is a strung cord 914 that is woven into the frame 902 to provide support for the rider. The cord 914 is strung onto the frame 902 in a manner similar to the way in which a tennis racket is strung. Since the cord 914 is woven into the frame, it is possible with this embodiment to vary the rigidity of the seat 900 by varying the tension applied to the cord 914. For this embodiment, it is also possible to vary the appearance of the seat 900 by choosing a cord 914 with a particular color.

Figure 10:
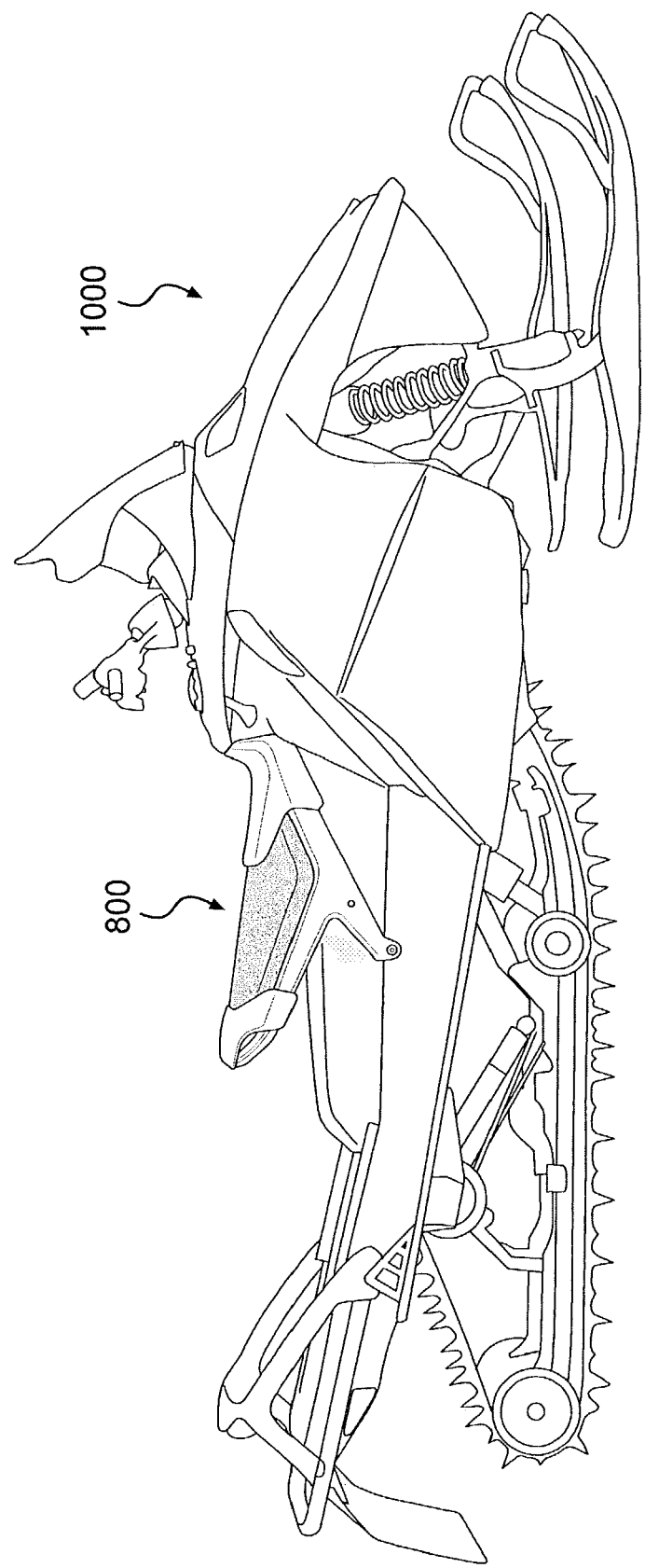
FIG. 10 is a right side view of an exemplary snowmobile including the seat illustrated in FIG. 8.

FIG. 10 illustrates one example of a snowmobile 1000 that includes the seat 800 thereon. As indicated previously, this is but one potential environment in which the seat 800 (or any of the other embodiments thereof) may be placed.

While each of the illustrated embodiments include rigid seat frames 210, 520, 704, 802, 902 that are mounted to the vehicle frame 110, the rigid seat frame may alternatively be integrally formed with the vehicle frame such that the mesh seat material covers a gap formed in the vehicle frame to define the seat.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A vehicle comprising:
    a frame;
    a steering system supported by the frame for steering the vehicle;
    an engine supported by the frame;
    a propulsion system operatively connected to the engine and supported by the frame; and
    a straddle-type seat disposed on the frame comprising
        a seat frame defining a gap therein and including a pivotable rear member, and
        a material suspended over the gap and attached to the seat frame to define a seating area.

2. The vehicle of claim 1, wherein the material comprises a mesh.

3. The vehicle of claim 1, further comprising two skis disposed on the frame, the steering system being operatively connected to the two skis; and wherein
   the frame includes a tunnel;
   the propulsion system includes an endless drive track below the tunnel; and
   the seat is disposed on the tunnel.

4. The vehicle of claim 1, wherein the vehicle is one of a snowmobile, a personal watercraft, an all-terrain vehicle, a motorcycle, and a boat.

5. The vehicle of claim 1, wherein the material is connected to the seat frame over at least a majority of a perimeter of the gap.

6. The vehicle of claim 1, wherein the pivotable rear member pivots about a laterally extending axis.

7. The vehicle of claim 6, wherein the material is pulled taut over the gap by pivoting the rear member, such that the material is suitable for supporting a rider thereon.

8. The vehicle of claim 7, wherein the straddle-type seat further comprises a tightening mechanism to hold the material tautly across the gap.

9. The vehicle of claim 8, wherein the seat frame comprises two seat frame portions supported by the frame, one of which is the rear member, and wherein the two seat frame portions define the gap therebetween.

10. The vehicle of claim 9, wherein the other of the two seat frame portions is a front member, and wherein the front member has an inverted U shape with first and second ends, wherein the rear member has an inverted U shape with third and fourth ends, wherein the first end connects to at least one of the third end and the frame, and wherein the second end connects to at least one of the fourth end and the frame.

11. The vehicle of claim 9, wherein the rear member is pivotally connected to a front member such that the rear member may pivot about a laterally extending axis.

12. The vehicle of claim 11, wherein at least a portion of the frame and at least a portion of the front member of the seat frame are integrally constructed.

13. The vehicle of claim 11, wherein the front member is rigidly connected to the frame.

14. The vehicle of claim 13, wherein the material connects to at least a portion of a perimeter of the front member and to at least a portion of a perimeter of the rear member, and wherein the vehicle further comprises a tightening mechanism operatively connected between the front and rear members to urge the members apart and thereby pull the material taut between the front and rear members.

15. The vehicle of claim 13, further comprising two skis disposed on the frame, the steering system being operatively connected to the two skis; and wherein
   the frame includes a tunnel;
   the propulsion system includes an endless drive track below the tunnel; and
   the seat is disposed on the tunnel.

16. The vehicle of claim 15, further comprising a tension strap connected between the rear member and the frame to pull the material taut between the front and rear members.

17. A snowmobile comprising:
   a frame including a tunnel;
   an engine disposed on the frame;
   a drive track disposed below and supported by the tunnel and operatively connected to the engine for propulsion of the snowmobile;
   two skis disposed on the frame, each via a front suspension; and
   a straddle-type seat disposed on the tunnel above the drive track and rearward of the engine;
   the straddle-type seat comprising:
      an inverted U-shaped front seat frame portion having first and second ends;
      an inverted U-shaped rear seat frame portion having third and fourth ends;
      a gap defined between the front and rear seat frame portions; and
      a material suspended over the gap and attached to the front and rear seat frame portions to define a seating area;
      wherein the first end connects to the third end, and wherein the second end connects to the fourth end so that the rear seat frame portion can move with respect to the front seat frame portion.

18. A straddle-type seat comprising:
   an inverted U-shaped front seat frame portion having first and second ends;
   an inverted U-shaped rear seat frame portion having third and fourth ends;
   a gap defined between the front and rear seat frame portions; and
   a material suspended over the gap and attached to the front and rear seat frame portions to define a seating area,
   wherein the first end connects to the third end, and wherein the second end connects to the fourth end so that the rear seat frame portion can move with respect to the front seat frame portion;
   wherein the rear seat frame portion is pivotally connected to the front seat frame portion for movement about a laterally extending axis; and
   wherein the material connects to at least a portion of a perimeter of the front seat frame portion and to at least a portion of a perimeter of the rear seat frame portion, and wherein the seat further comprises a tightening mechanism operatively connected between the front and rear seat frame portions to urge the portions apart and thereby pull the material taut between the front and rear portions.

19. The straddle-type seat of claim 18, wherein the material has an inverted U shape as viewed from the rear.

20. The straddle-type seat of claim 18, wherein the material comprises a mesh.

21. The straddle-type seat of claim 18, further comprising a tension strap connected between the rear seat frame portion and a vehicle frame to pull the material taut between the front and rear seat frame portions.

22. The straddle-type seat of claim 18, wherein the material is pulled taut over the gap such that the material is suitable for supporting a rider thereon.

23. The straddle-type seat of claim 22, further comprising a tightening mechanism to hold the material tautly across the gap.

* * * * *